Sept. 16, 1924.

C. N. ALDERMAN

BOX DUMP

Filed Oct. 7, 1922

INVENTOR
Charles N. Alderman
BY
James J. Sheehy & Co.
ATTORNEYS

Patented Sept. 16, 1924.

1,508,946

UNITED STATES PATENT OFFICE.

CHARLES N. ALDERMAN, OF STREATOR, ILLINOIS.

BOX DUMP.

Application filed October 7, 1922. Serial No. 593,139.

*To all whom it may concern:*

Be it known that I, CHARLES N. ALDERMAN, a citizen of the United States, residing at Streator, in the county of La Salle and State of Illinois, have invented new and useful Improvements in Box Dumps, of which the following is a specification.

My present invention pertains to dump carts and the like and it contemplates the provision of a simple and inexpensive construction through the medium of which the box that is generally provided on gravel trucks, coal trucks and the like may be easily moved by a lever to a position whereby the gravity of the load will be sufficient to dump the body thereof and allow the contents of the body to fall to the ground.

The invention also contemplates the provision in a dump box of means whereby the body may be thrown by lever and by gravity of the contents to an angle and the tail gate released to permit of the dumping of the contents.

The invention in all of its details will be fully understood from the following description and claims when the same are read in connection with the drawings forming part of this application, in which—

Figure 3 is a rear elevation of the tail gate of the dump box.

Similar numerals of reference designate corresponding parts in all the views of the drawings.

Figure 1:
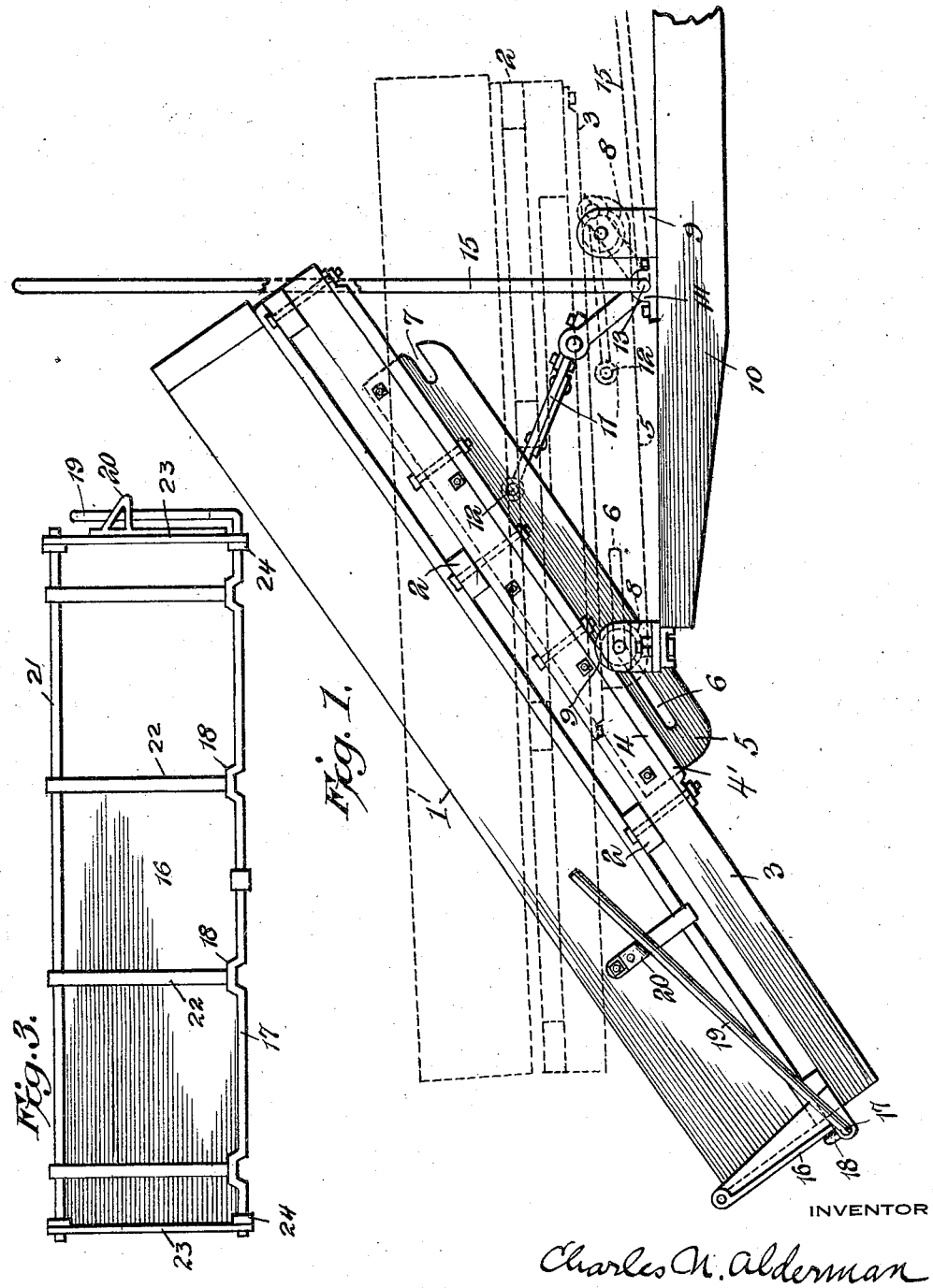
Figure 1 is a side elevation of a truck body with the cab removed and showing the dump box in inoperative position in dotted lines and in operative position in solid lines.
Figure 2:
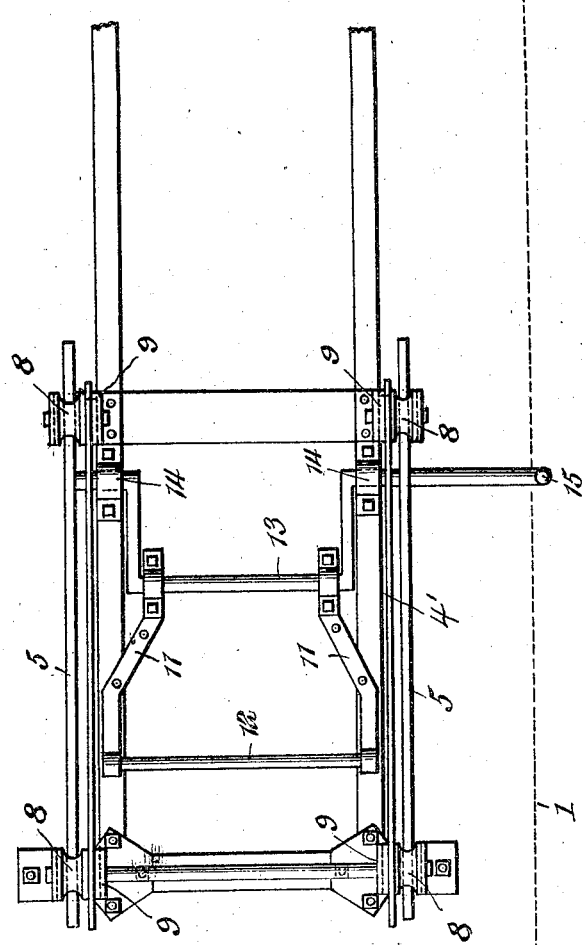
Figure 2 is a top plan view of the mechanism employed to move the dump box.

My novel construction comprises the dump box 1 that rests upon equi-distant beams or blocks 2 that are secured by means of bolts to the base 3 of the dump box and secured to a plate 4 and the said plate is provided with bolts whereby it is permanently secured to said base 3 and at its lower end the plate is provided with a downwardly extending portion 5 having a slot 6 in the rear thereof and at its forward end the open slot 7. The plate 4 is further provided with a track 4' that is bolted to each side of the dump. The main frame 10 of the wagon is provided with hangers 9 through which shafts extend and mounted on said shafts are pulleys 8 and the slot 6 in the rear of the plate straddles the shaft in the rear of the member 10 and the slots 7 at the forward end of the plate 5 straddle the forward shafts of the forward hangers 9. Secured to the underside of the dump box are frames having the shafts 12 and 13 that are actuable through the links 11 by means of the lever 15. The arms of the shaft 13 are mounted in collars 14 as shown. The lever 15 is a continuation of one arm of the shaft 13 and is fulcrumed in one collar 14 and is movable from the full line position in Figure 1 to the dotted line position in Figure 1 and vice versa. In order to move the dump box to the full line position in Figure 1 the lever 15 is pulled upwardly from the dotted line position and this will cause the shafts 12 and 13 to push the dump rearwardly so as to release the slots 7 from the forward shafts. When the dump has arrived at this position the gravity of the load will cause the dump to tilt and the links 11 to extend to their full length. When the entire load has passed from the dump box, the weight thereof and especially the increased forward weight including the plates 5 and their appurtenances will cause the dump to move flat upon the main frame of the wagon.

At its rear the body 1 is provided with an end gate 16 that is pivoted to an upper bar 21 by means of downwardly extending bars 22. End bars 23 are pivoted to bar 21 and adapted to bear and turn in the bars 23 is a bar 17 having bent portions 18 that normally rest against the lower end of bars 22 (Fig. 3). The bar 17 terminates in a lever 19 that normally rests under a keeper 20. When the box 1 is in the full line position shown in Fig. 1 and it is desired to open the gate 16 it is simply necessary to raise the lever 19. This will rotate rod 17 until the lower ends of the rods 22 take into the indented portions of the rod 17. The load striking the gate will retain the gate in open position. To close the gate it is simply necessary to return the box to the dotted line position (Fig. 1) when the gate will bear against the end of the box and then by pulling lever 19 downwardly until it strikes keeper 20, the bar 17 will be turned until portions 18 bear on the ends of the rod 22.

It will be gathered from the foregoing that in the manipulation and use of a dump wagon such as that set forth may be accomplished with a very slight amount of effort and no expensive elements are necessary to dump the box and that only the initial impulse is exerted manually, for the reason that after the dump has arrived at a certain slidable position on the body the remaining operation is automatic and the pressure of the contents on the tail gate will manifestly require but a very small amount of manual pressure on the tail gate lever. The return by gravity of the body of the dump to the frame of the wagon will also automatically return the tail gate lever to its locked position.

In order to keep the load from falling too fast and to relieve jar on the rear axle, an expansion spring may be connected to the front of the box 1 with the beam under the cab.

Having described my invention, what I claim and desire to secure by Letters Patent is, 1. In a dump wagon, the combination of a wagon frame, a dump box slidably mounted on the frame, a plate secured to the underside of the box, slots arranged adjacent one end of the plate, and slots formed in the opposite end of the plate and open at their forward ends, a shaft secured to the frame and having pulleys thereon, a shaft secured to the approximate forward end of the frame and having pulleys thereon adapted to normally seat in the open slots, a shaft fulcrumed in the plate and movable therewith, arms depending from the ends of the shaft, a crank arm secured to the frame by brackets at one end and at its opposite end to the arms and a lever arranged alongside the frame and comprising an extension of one end of the crank arm.

2. In a dump wagon the combination of a main-frame, a sub-frame movable on the main frame, L-shaped plates in cross-section arranged under and secured to the sub-frame, slots formed in one end of the plates, open-end slots formed in the opposite end of the plates, bearings on the main-frame and adapted to be engaged by the slots to limit upward movement of the sub-frame with respect to the main-frame and means arranged in the plates and main-frame for moving the sub-frame upwardly and rearwardly with respect to the main-frame, said means comprising a shaft secured to the sub-frame, arms extending from and secured to the shaft, a crank shaft secured to the main-frame and arms, and a lever formed on one end of the crank shaft.

In testimony whereof I have hereunto set my hand in presence of two subscribing witnesses.

CHARLES N. ALDERMAN.

Witnesses:
W. H. CRAMPTER,
T. F. HENRY.